United States Patent
Hirakawa

(10) Patent No.: US 12,422,972 B2
(45) Date of Patent: Sep. 23, 2025

(54) INFORMATION PROCESSING APPARATUS, INFORMATION PROCESSING SYSTEM, AND NON-TRANSITORY COMPUTER READABLE MEDIUM

(71) Applicant: FUJIFILM CORPORATION, Tokyo (JP)

(72) Inventor: Eri Hirakawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 255 days.

(21) Appl. No.: 18/049,247

(22) Filed: Oct. 24, 2022

(65) Prior Publication Data
US 2023/0176709 A1  Jun. 8, 2023

(30) Foreign Application Priority Data
Dec. 8, 2021  (JP) .................................. 2021-199644

(51) Int. Cl.
*G06F 3/0482* (2013.01)
*H04M 1/27467* (2020.01)

(52) U.S. Cl.
CPC ...... *G06F 3/0482* (2013.01); *H04M 1/27467* (2020.01)

(58) Field of Classification Search
CPC .................................................. G06F 3/0482
USPC ........................................................ 715/243
See application file for complete search history.

(56) References Cited

U.S. PATENT DOCUMENTS

| | | | | |
|---|---|---|---|---|
| 7,694,311 B2* | 4/2010 | Amir | ......................... | G06F 8/30 709/200 |
| 11,460,983 B2* | 10/2022 | Choi | .................. | G06Q 30/0267 |
| 2001/0049681 A1* | 12/2001 | Bova | ....................... | G06F 16/27 |
| 2006/0221957 A1* | 10/2006 | Ozawa | .................... | H04L 12/18 370/389 |

(Continued)

FOREIGN PATENT DOCUMENTS

| | | |
|---|---|---|
| JP | 2002-041681 A | 2/2002 |
| JP | 2008-124751 A | 5/2008 |

(Continued)

OTHER PUBLICATIONS

English language translation of the following: Office action dated May 7, 2025 from the JPO in a Japanese patent application No. 2021-199644 corresponding to the instant patent application. This office action translation is submitted now in order to supplement the understanding of the cited references which are being disclosed in the instant Information Disclosure Statement.

(Continued)

*Primary Examiner* — Reza Nabi
(74) *Attorney, Agent, or Firm* — SOLARIS Intellectual Property Group, PLLC

(57) ABSTRACT

An information processing apparatus includes a processor configured to: display a contact screen displaying an address displayable in a display area, the address being included in an address of a type registered in advance on a per-contact basis; receive a type of an address to be displayed among addresses of multiple types registrable on the per-contact basis; and in response to the address of the received type not being displayed in the display area, execute a process for displaying the contact screen after changing the contact screen to display the address of the received type.

18 Claims, 12 Drawing Sheets

(56) References Cited

U.S. PATENT DOCUMENTS

| | | | |
|---|---|---|---|
| 2007/0067726 A1* | 3/2007 | Flynt | H04M 1/72403 715/733 |
| 2008/0114903 A1* | 5/2008 | Tadokoro | G06F 21/33 726/4 |
| 2009/0089316 A1* | 4/2009 | Kogan | H04M 1/2748 707/999.102 |
| 2009/0100071 A1* | 4/2009 | Kobayashi | H04N 1/32096 |
| 2010/0094703 A1* | 4/2010 | Bramley | G06Q 30/0255 715/823 |
| 2010/0188697 A1* | 7/2010 | Maeda | H04N 1/32058 358/1.15 |
| 2011/0078150 A1* | 3/2011 | Rashad | H04L 12/6418 707/E17.037 |
| 2011/0078175 A1* | 3/2011 | Rashad | G06F 16/2465 707/769 |
| 2011/0078259 A1* | 3/2011 | Rashad | G06Q 10/107 706/54 |
| 2011/0078260 A1* | 3/2011 | Rashad | G06Q 10/107 709/206 |
| 2011/0130168 A1* | 6/2011 | Vendrow | H04L 51/216 455/556.1 |
| 2012/0079604 A1* | 3/2012 | Hikichi | H04L 51/48 726/26 |
| 2013/0132883 A1* | 5/2013 | Vayrynen | G06F 3/0482 715/830 |
| 2013/0324074 A1* | 12/2013 | Way | H04W 4/024 455/456.1 |
| 2015/0178553 A1* | 6/2015 | Yoo | G06F 16/434 382/118 |
| 2015/0347010 A1 | 12/2015 | Yang et al. | |
| 2015/0350296 A1 | 12/2015 | Yang et al. | |
| 2015/0350297 A1* | 12/2015 | Yang | G06F 3/1423 715/740 |
| 2016/0162924 A1* | 6/2016 | Rathod | G06Q 30/0231 705/14.19 |
| 2016/0364740 A1* | 12/2016 | Parker | G06Q 10/105 |
| 2017/0192730 A1 | 7/2017 | Yang et al. | |
| 2017/0374230 A1* | 12/2017 | Song | H04N 1/00408 |
| 2020/0341617 A1* | 10/2020 | Xiong | G06F 9/44 |
| 2021/0096735 A1* | 4/2021 | Hirakawa | G06F 3/04847 |
| 2021/0173431 A1 | 6/2021 | Yang et al. | |
| 2022/0163996 A1 | 5/2022 | Yang et al. | |
| 2023/0176709 A1* | 6/2023 | Hirakawa | G06F 3/0482 715/243 |
| 2025/0208750 A1* | 6/2025 | Hirakawa | G06F 3/0484 |

FOREIGN PATENT DOCUMENTS

| | | |
|---|---|---|
| JP | 2009-094887 A | 4/2009 |
| JP | 2010-171831 A | 8/2010 |
| JP | 2013-004072 A | 1/2013 |
| JP | 2021-119499 A | 8/2021 |

OTHER PUBLICATIONS

Austin: "How to Display Only Contacts With Phone Numbers on Android", May 20, 2021, pp. 1-9, XP93039220, Retrieved from the internet: URL: https://www.groovypost.com/howto/howto/fix-android-contact-list/ [retrieved on Apr. 14, 2023].

Partial European Search Report dated May 8, 2023, issued in corresponding EP Patent Application No. 22208937.7.

* cited by examiner

FIG. 3

| | × New address name |
|---|---|
| 👤 | Address name ☆<br>New address name |
| | Japanese phonetic syllabary characters<br>a-ta-ra-shi-i a-te-sa-ki-mei |
| › | Family name<br>(not set) |
| | First name<br>(not set) |
| | Company name<br>(not set) |
| | e-mail ☆<br>usemame@domain.com |
| | SMB<br>(not set) |
| | FTP<br>(not set) |
| | SFTP<br>(not set) |
| | Fax ☆<br>1234567890 |
| | IP fax<br>(not set) |
| | Internet fax<br>(not set) |

OK

FIG. 12
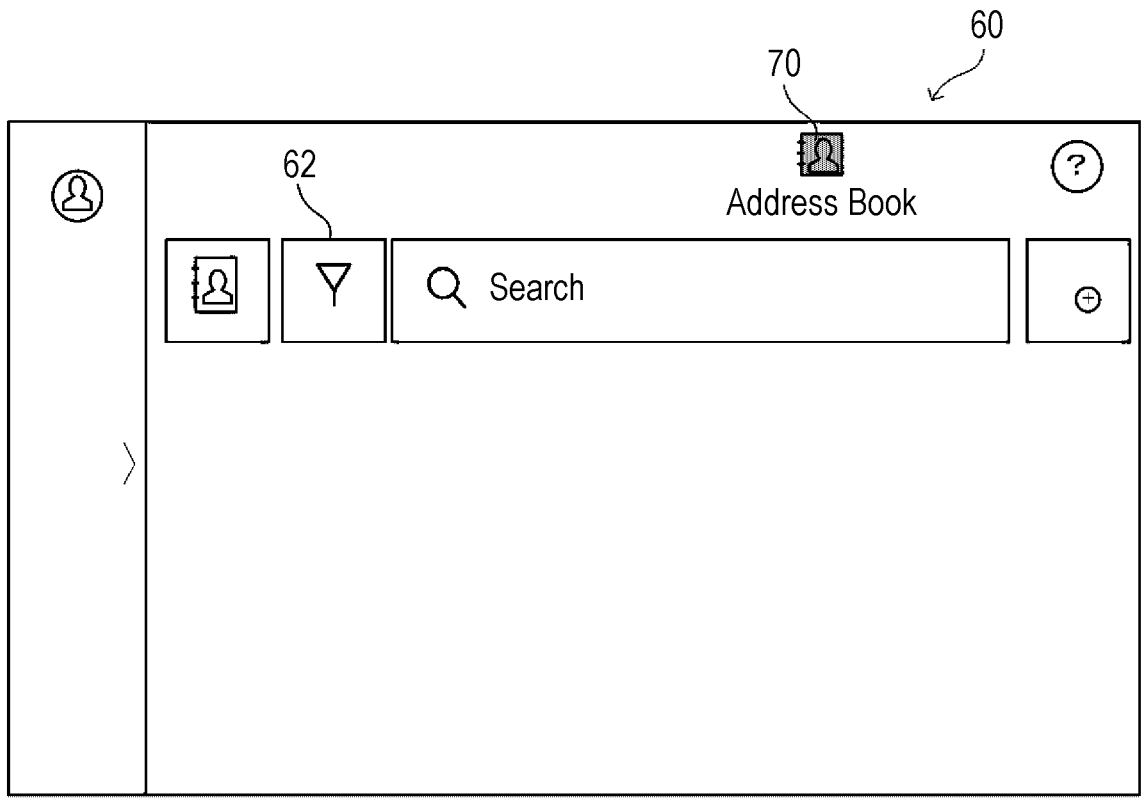
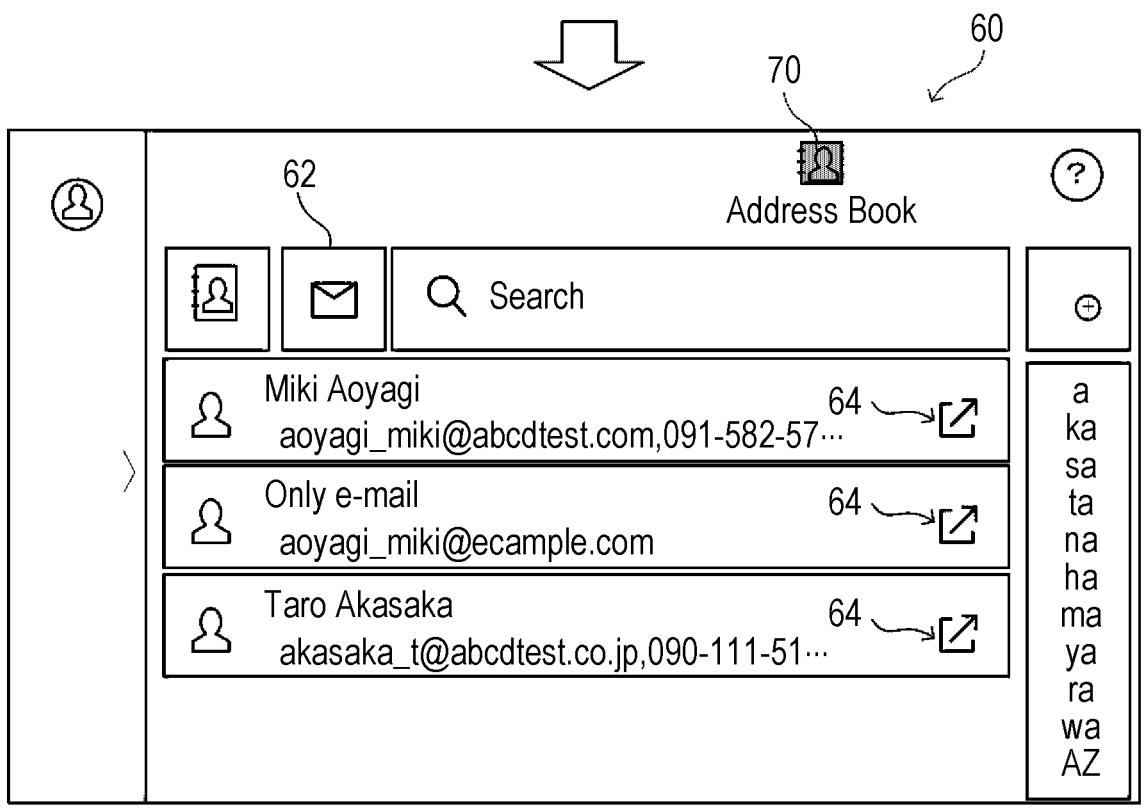

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-199644, filed on Dec. 8, 2021, the entire disclosure of which is incorporated by reference herein.

BACKGROUND

(i) Technical Field

The present disclosure relates to an information processing apparatus, an information processing system, and a non-transitory computer readable medium.

(ii) Related Art

Japanese Patent Application Publication No. 2021-119499 proposes that a local application icon for launching a local application for an external application is displayed near multiple application icons displayed on the display screen of an electronic device in an unlocked state. The local application icon is displayed: in response to the reception of information indicating the current use of the external application in the external device while the multiple application icons are displayed; and on the basis of the presence of the external device in the range near the electronic device.

Japanese Unexamined Patent Application Publication No. 2013-004072 proposes an electronic information transmission system capable of collective input from a collective input screen and collective transmission to multiple transmission destinations through an electronic information transmission relay device, in transmitting specific electronic information input by a user to multiple transmission destinations including providers who provide different types of services such as e-mail, blogs, and SNS.

Japanese Unexamined Patent Application Publication No. 2009-094887 proposes an image transmission apparatus that registers an option for a transmission destination. Specifically, a transmission method based on recipient setting is registered for recipients, and a list of transmission destination names corresponding to the respective recipients is acquired from an address server. Selection of whether to follow the recipient setting is received from a user at the time of registering an option for a transmission destination used for transmitting image data. If the recipient setting is not followed, input of a transmission destination name and a transmission method for the transmission destination name is received from the user. If the recipient setting is followed, a transmission destination name is received from the transmission destination name list. If the input of the transmission destination name and the transmission method is received, the transmission destination name and the transmission method are registered in association with each other as one of transmission destination options. If the selection of the transmission destination name is received, the transmission destination name and the selection of the following of the recipient setting are registered in association with each other as one of the transmission destination options.

SUMMARY

Suppose a case where addresses of multiple types are registerable for one contact. When the contact is displayed including the registered addresses, some limitation on a display area prevents the addresses from being displayed up to an address of an intended type, and thus the address of the intended type is prevented from being verified on occasions.

Aspects of non-limiting embodiments of the present disclosure relate to providing an information processing apparatus, an information processing system, and a non-transitory computer readable medium that are enabled to verify an address of an intended type at the time of displaying a contact allowing the registration of the addresses of multiple types.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: display a contact screen displaying an address displayable in a display area, the address being included in an address of a type registered in advance on a per-contact basis; receive a type of an address to be displayed among addresses of multiple types registrable on the per-contact basis; and in response to the address of the received type not being displayed in the display area, execute a process for displaying the contact screen after changing the contact screen to display the address of the received type.

BRIEF DESCRIPTION OF THE DRAWINGS

An exemplary embodiment of the present disclosure will be described in detail based on the following figures, wherein:

FIG. 3 is a view illustrating an example of a contact registration screen;

FIG. 12 is a view illustrating an example in which after the type of an address is selected, the contact list screen is displayed in such a manner that addresses of the selected type are given a higher display priority over addresses of different types.

DETAILED DESCRIPTION

Figure 1:
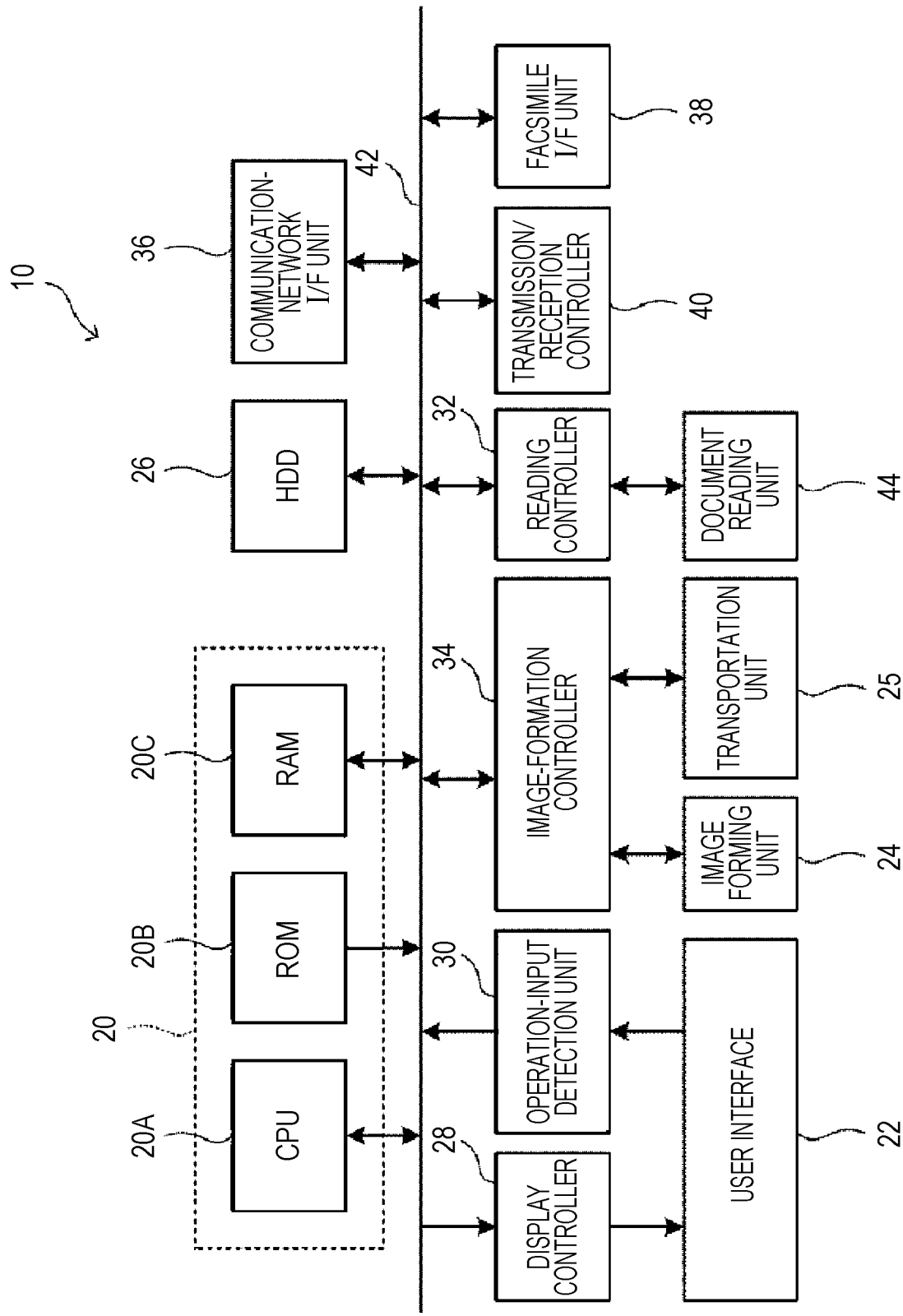
FIG. 1 is a block diagram illustrating the configuration of an image forming apparatus according to this exemplary embodiment.

Hereinafter, an example of an exemplary embodiment of the present disclosure will be described in detail with reference to the drawings. In this exemplary embodiment, an image forming apparatus will be described as an example of an information processing apparatus. FIG. 1 is a block diagram illustrating the configuration of the image forming apparatus according to this exemplary embodiment.

For example, an image forming apparatus having multiple functions such as a faxing function, an image reading function, an image forming function, a copying function, a storage function of storing image information and the like, and a transmission function of transmitting image information and the like is applied to an image forming apparatus 10 according to this exemplary embodiment.

As illustrated in FIG. 1, the image forming apparatus 10 according to this exemplary embodiment includes a control unit 20 including a central processing unit (CPU) 20A as an example of a processor, a read only memory (ROM) 20B, and a random access memory (RAM) 20C. The CPU 20A administers the overall operation of the image forming apparatus 10. The RAM 20C is used as a work area or the like at the time when the CPU 20A runs various programs. The ROM 20B stores in advance various control programs, various parameters, and the like. In the image forming apparatus 10, the components of the control unit 20 are electrically connected through a system bus 42.

The image forming apparatus 10 according to this exemplary embodiment includes a hard disk drive (HDD) 26 that stores various pieces of data, application programs, and the like. The image forming apparatus 10 also includes a display controller 28 that is connected to a user interface 22 and that controls the display of various operation screens and the like to be displayed on the display of the user interface 22. The image forming apparatus 10 also includes an operation-input detection unit 30 that is connected to the user interface 22 and that detects an operation instruction input by using the user interface 22. In the image forming apparatus 10, the HDD 26, the display controller 28, and the operation-input detection unit 30 are electrically connected to the system bus 42. Although the HDD 26 is applied to a memory in the image forming apparatus 10 according to this exemplary embodiment, the memory is not limited to this. A nonvolatile memory such as the flash memory may also be applied.

The image forming apparatus 10 according to this exemplary embodiment also includes a reading controller 32 and an image-formation controller 34. The reading controller 32 controls an optical image-reading operation by a document reading unit 44 and a document feed operation by a document transportation unit. The image-formation controller 34 controls an image forming process by an image forming unit 24 and sheet transportation to the image forming unit 24 by a transportation unit 25. The image forming apparatus 10 also includes a communication network interface (I/F) unit 36 that transmits and receives communication data to and from a different external apparatus connected to a communication network 16 for various networks and an apparatus such as a mobile terminal apparatus through near field communication. The image forming apparatus 10 also includes a facsimile I/F unit 38 that is connected to a telephone network (not illustrated) and that transmits and receives facsimile data to and from a fax machine connected to the telephone network. The image forming apparatus 10 also includes a transmission/reception controller 40 that controls transmission and reception of facsimile data through the facsimile I/F unit 38. In the image forming apparatus 10, the transmission/reception controller 40, the reading controller 32, the image-formation controller 34, a communication-network I/F unit 36, and the facsimile I/F unit 38 are electrically connected to the system bus 42.

With the configuration above, in the image forming apparatus 10 according to this exemplary embodiment, the CPU 20A allows access to each of the RAM 20C, the ROM 20B, and the HDD 26. By using the CPU 20A, the image forming apparatus 10 also controls displaying of an operation screen to be displayed on a display 22A of the user interface 22 by using the display controller 28 and information such as various messages. By using the CPU 20A, the image forming apparatus 10 also controls the operation of the document reading unit 44 and the document transportation unit by using the reading controller 32. By using the CPU 20A, the image forming apparatus 10 controls the operation of the image forming unit 24 and the transportation unit 25 by using the image-formation controller 34 and controls the transmission and reception of the communication data by using the communication-network I/F unit 36. In the image forming apparatus 10, the CPU 20A controls the transmission and reception of facsimile data by the transmission/reception controller 40 by using the facsimile I/F unit 38. Further, in the image forming apparatus 10, the CPU 20A comprehends the content of operations of the user interface 22 on the basis of operation information detected by the operation-input detection unit 30 and performs various controls based on the content of the operation.

Figure 2:
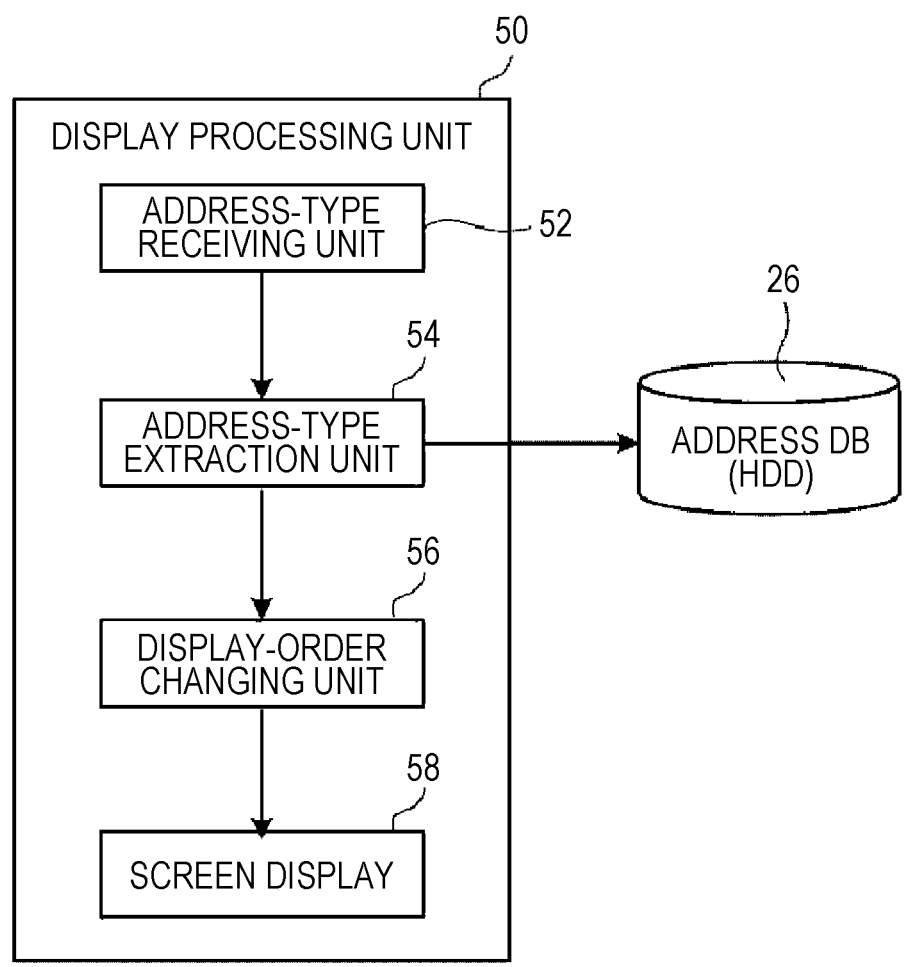
FIG. 2 is a block diagram illustrating an example functional configuration of a control unit of the image forming apparatus according to this exemplary embodiment.

FIG. 2 is a block diagram illustrating an example functional configuration of the control unit 20 of the image forming apparatus 10 according to this exemplary embodiment.

As illustrated in FIG. 2, the CPU 20A runs a program stored in the ROM 20B, and thereby the control unit 20 of the image forming apparatus 10 according to this exemplary embodiment functions as a display processing unit 50 that executes, for example, a process for displaying the operation screen for operating the image forming apparatus 10.

The display processing unit 50 executes a process for displaying a contact registration screen for registering a contact and a process for displaying a contact list screen as an example of a contact screen representing the registered contacts.

The contact registration screen is a screen for registering a contact such as an address name or an address. For example, the screen as illustrated in FIG. 3 is displayed as the contact registration screen. In the image forming apparatus 10 according to this exemplary embodiment, addresses of multiple types are registerable for one contact. For example, as illustrated in FIG. 3, when a new address name is registered as a contact, addresses of multiple types are registerable for one contact (the address name in FIG. 3). The example in FIG. 3 illustrates an example screen for registering, as a type of an address, e-mail, server message block (SMB), file transfer protocol (FTP), SSH file transfer protocol (SFTP), fax, Internet protocol (IP) fax, and Internet fax.

Figure 4:
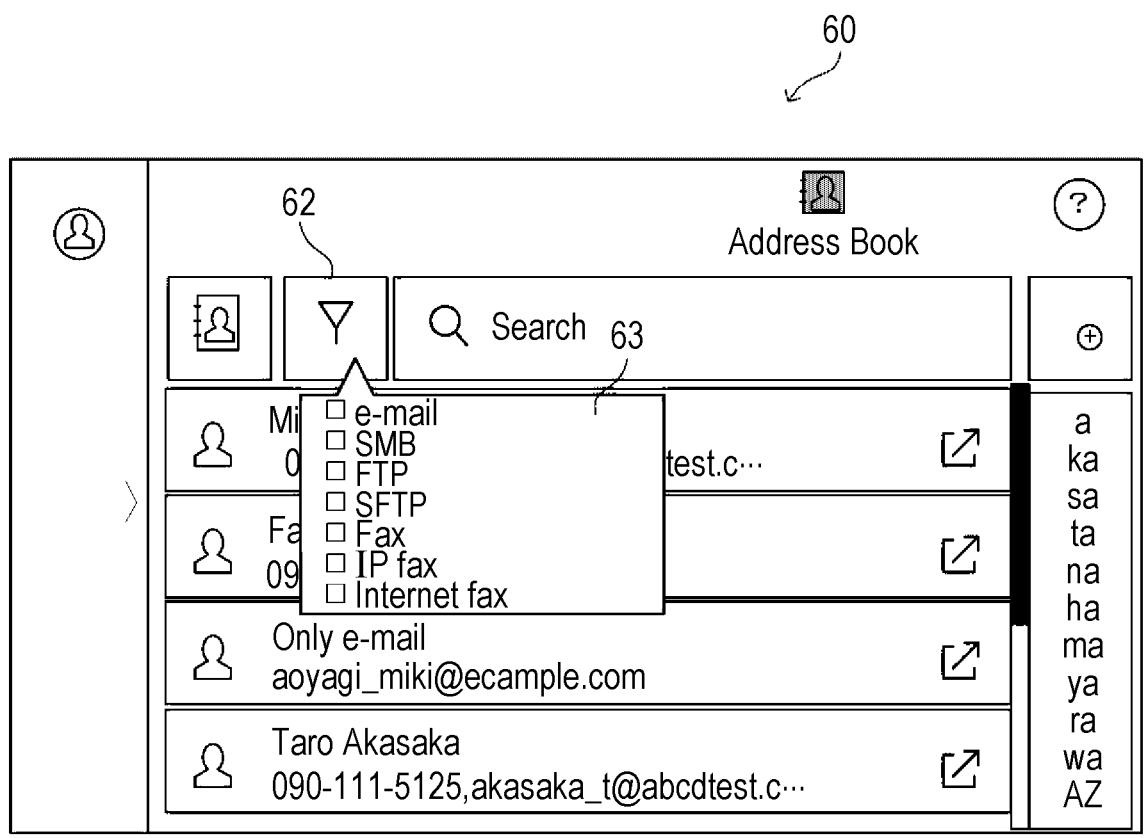
FIG. 4 is a view illustrating an example of a contact list screen.

The contact list screen is a screen on which addresses of multiple types registered from the contact registration screen are displayed on a per-contact basis. The image forming apparatus 10 according to this exemplary embodiment displays a contact list screen 60 as illustrated in FIG. 4. The addresses of multiple types registered from the contact registration screen are thus displayed on a per-contact basis. FIG. 4 is a view illustrating an example of the contact list screen 60.

In a detailed description, the display processing unit 50 has respective functions of an address-type receiving unit 52, an address-type extraction unit 54, a display-order changing unit 56, and a screen display 58.

The address-type receiving unit 52 receives a type of an address to be displayed among the addresses of multiple types registerable on a per-contact basis. In the image forming apparatus 10 according to this exemplary embodiment, addresses may be filtered on the basis of an address type in displaying the contact list screen 60 representing a list of registered contacts. The address-type receiving unit 52 thus receives an address type for the filtering. For example, the address type is received by receiving an operation of an address-type selection button 62 in FIG. 4. For example, if an operation of the address-type selection button 62 illustrated in FIG. 4 is received, a window 63 displaying a selectable address type is displayed, a selection result is received, and thereby an address type is received. An address type may be changed every touch operation of the address-type selection button 62.

Figure 5:
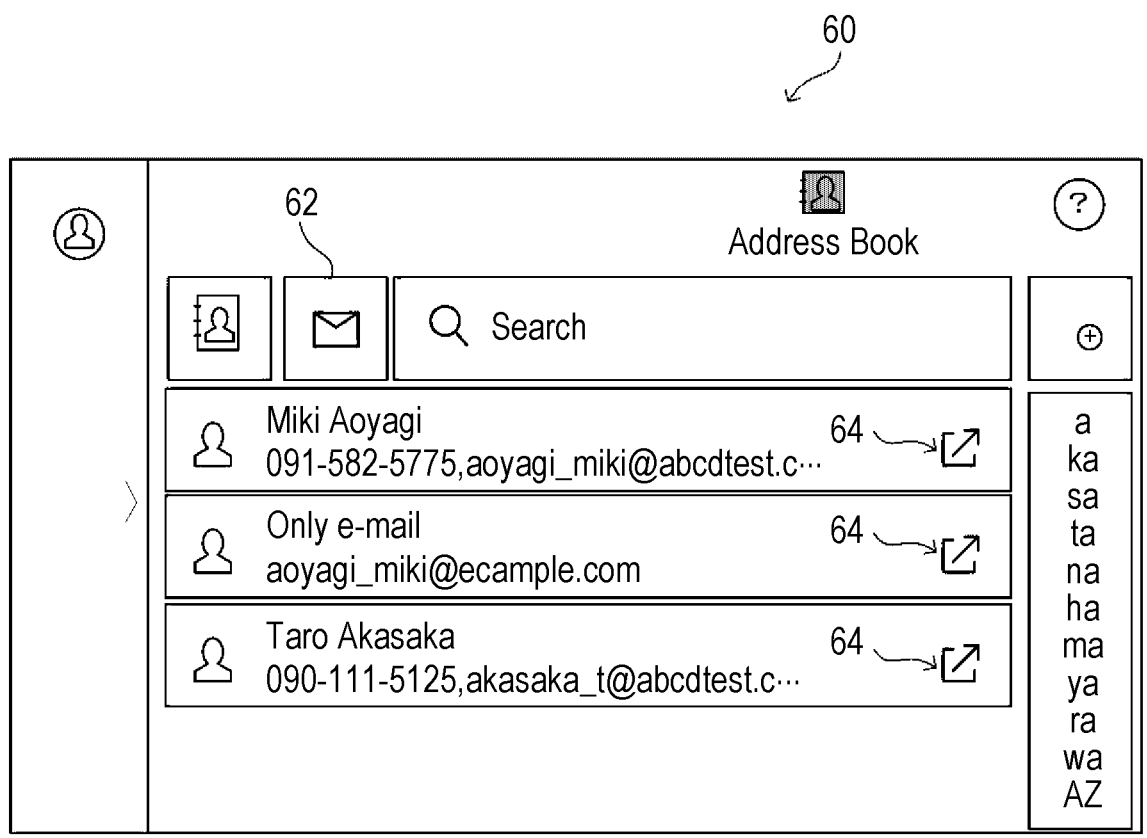
FIG. 5 is a view illustrating an example in which addresses including registered e-mails are displayed on the contact list screen after e-mail is selected by using an address-type selection button.

The address-type extraction unit 54 extracts contacts for which the address type received by the address-type receiving unit 52 is registered, from contacts registered in advance in the HDD 26 as an address database (DB). For example, if e-mail is received as the address type, contacts including e-mail registered as the address type are extracted. FIG. 5 illustrates an example in which after e-mail is selected by using the address-type selection button 62, addresses including e-mail registered as the address type are extracted and are displayed on the contact list screen 60.

Figure 6:
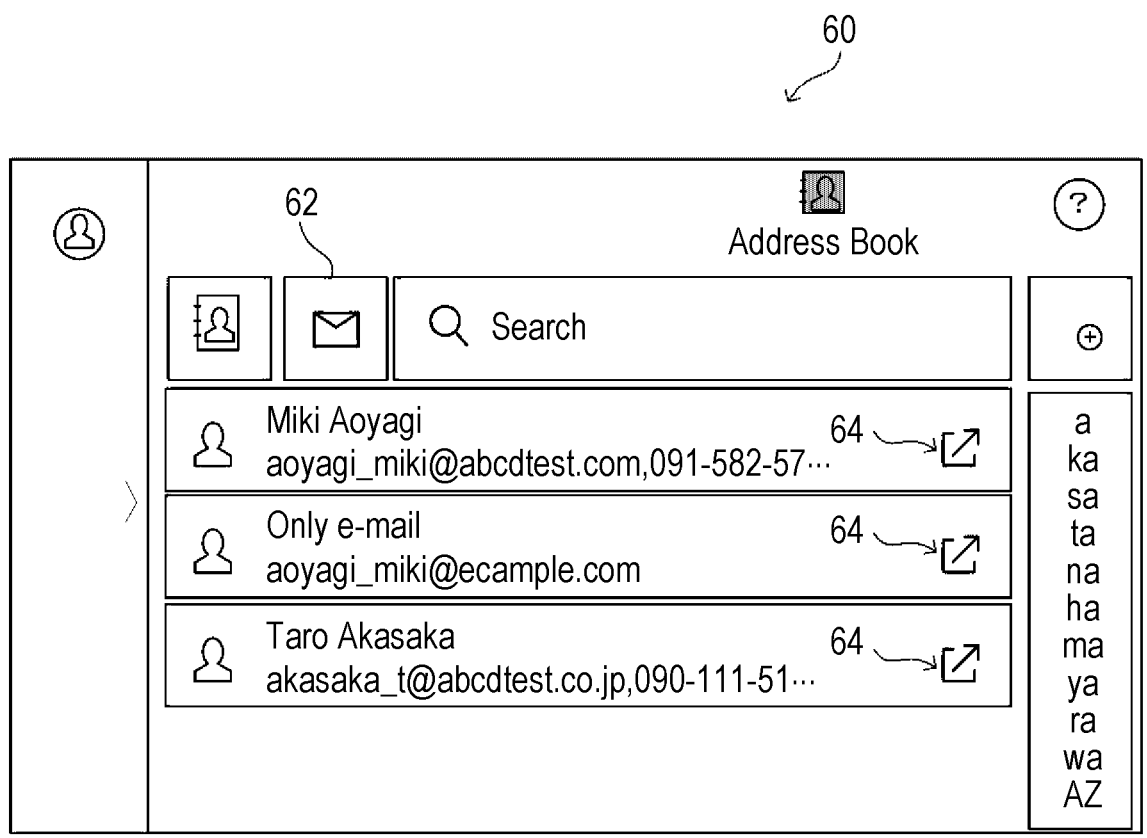
FIG. 6 is a view illustrating an example of a contact list screen having undergone display order change to display e-mail in the first place among addresses of multiple types.
Figure 7:
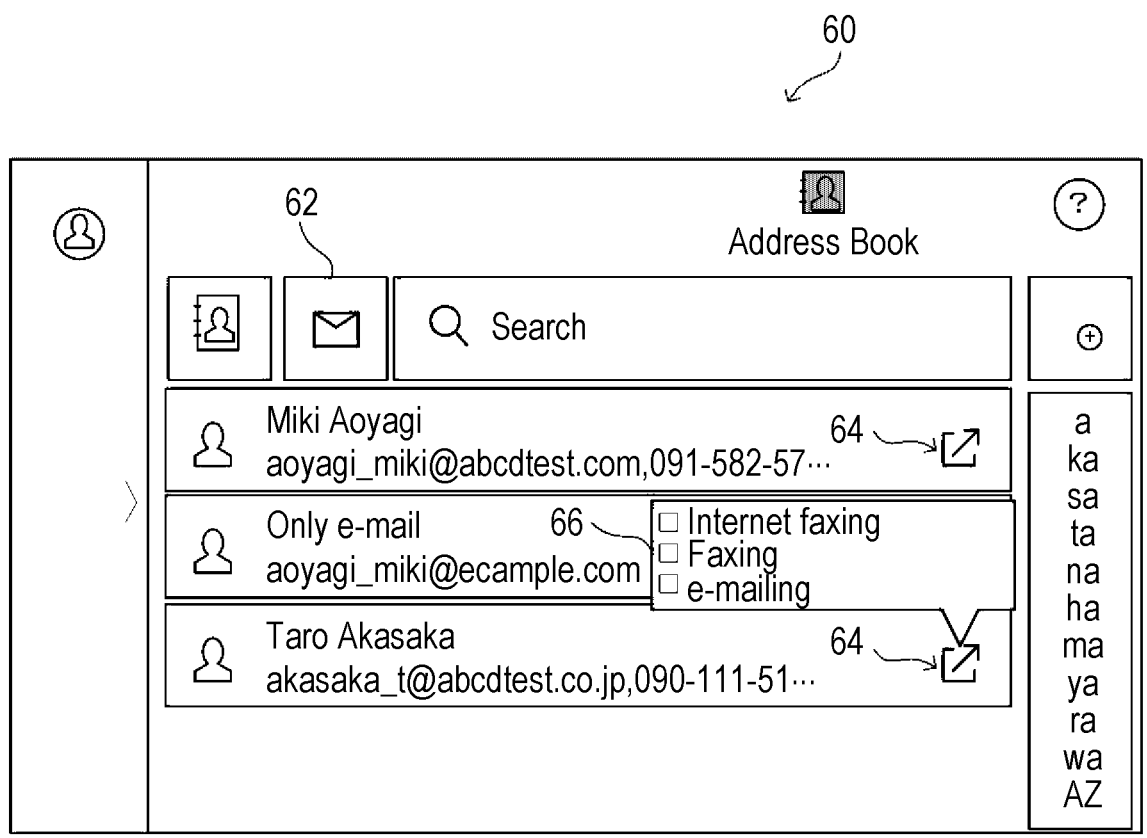
FIG. 7 is a view illustrating an example of an application window for selecting an application.
Figure 8:
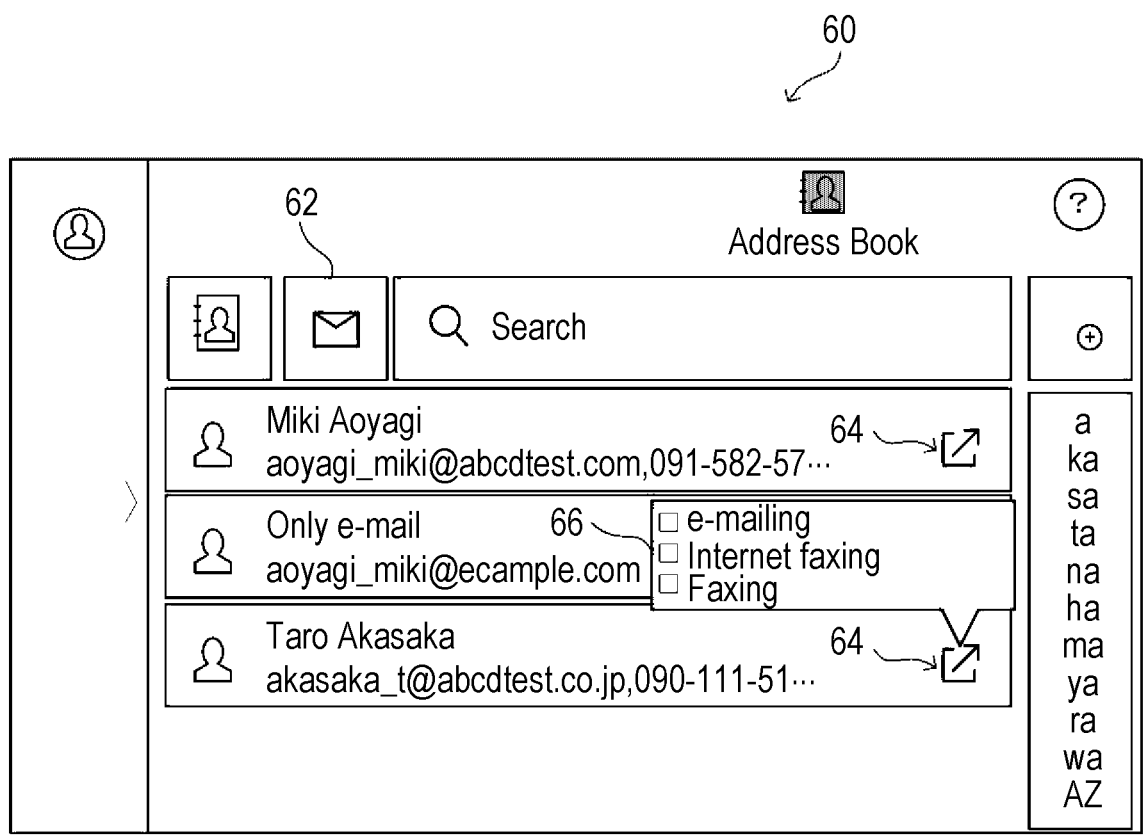
FIG. 8 is a view illustrating an example of an application window in which the display order of e-mailing serving as an application is changed to the first place after e-mail is received as the type of an address.

The display-order changing unit 56 changes a display order in which the addresses of multiple types registered on a per-contact basis are displayed on the contact list screen. The display order in the addresses of multiple types may be changed to display addresses of the type received by the address-type receiving unit 52 in the display area at the time of displaying addresses displayable in the display area among the addresses of the type registered in advance on a per-contact basis. Alternatively, addresses of the received type may be displayed in such a manner as to be given a higher display priority over addresses of different types in a predetermined display order in which the addresses of multiple types are displayed on the contact list screen 60. In this exemplary embodiment, as the predetermined display order, each of SMB, FTP, and SFTP, Internet fax, fax, and e-mail are set in this order by default. Hereinafter, an example in which the display-order changing unit 56 changes the display order to display an address of the type received by the address-type receiving unit 52 in the first place will be described. Specifically, in the case of receiving, for example, e-mail as the address type, the display-order changing unit 56 changes the display order to display e-mail in the first place among the addresses of multiple types, as illustrated in FIG. 6. In the example in FIG. 6, all of character strings of each address are displayable in the first place in the display area. In addition, in this exemplary embodiment, if one of application selection buttons 64 provided on a per-contact basis on the contact list screen 60 is operated, an application window 66 for selecting an application associated with the address type registered for the corresponding contact, as illustrated in FIG. 7. To display the application window 66, the display order of applications is also changed to preferentially display the application, for example, to display, in the first place, the application associated with the address type received by the address-type receiving unit 52. For example, FIG. 8 illustrates an example in which if e-mail is received as the address type, the display order of e-mailing as an application is changed to the first place. Note that in this exemplary embodiment, the display order is changed to display the address of the received type and the application associated with the address of the received type are displayed in the first place; however, if the address and the application in the second or succeeding place are displayable in the display area, the display order does not have to be changed, but the display priority may be changed to display the address and the application in the place preceding the second place. For example, if the address of the received type is displayable in a place other than the first place, the contact list screen 60 may be displayed without changing the display order. If there is a contact for which an address of the received type is not displayed in the display area, the display priority may be changed only for the contact.

The screen display 58 executes a process for displaying the contact list screen or the like on the display of the user interface 22 in accordance with the result of the change by the display-order changing unit 56.

In this exemplary embodiment, the display processing unit 50 includes the address-type extraction unit 54. Contacts for which addresses of the type received by the address-type receiving unit 52 are registered are thus extracted, and the contact list screen 60 is displayed. However, the address-type extraction unit 54 may be omitted, and registered contacts may be displayed without being narrowed down.

Figure 9:
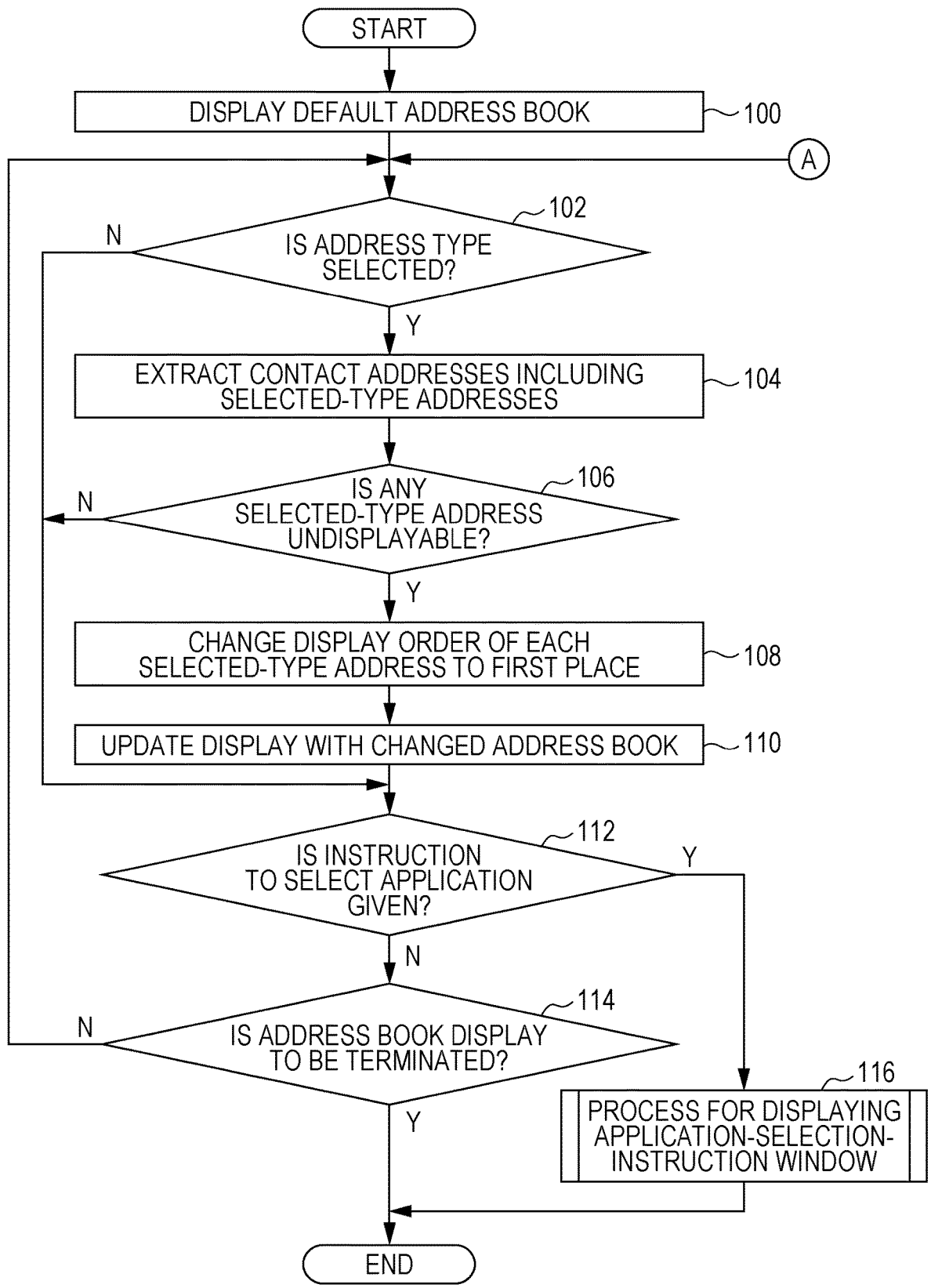
FIG. 9 is a flowchart illustrating an example of processing performed by a display processing unit of the image forming apparatus according to this exemplary embodiment.

Specific processing performed by the image forming apparatus 10 according to this exemplary embodiment as configured above will be described. FIG. 9 is a flowchart illustrating an example of the processing performed by the display processing unit 50 of the image forming apparatus 10 according to this exemplary embodiment. The processing in FIG. 9 is started, for example, in response to an instruction to display an address book is given by operating the user interface 22.

In step S100, the CPU 20A displays the default address book, and the processing proceeds to step S102. For example, as illustrated in FIG. 4, the contact list screen 60 is displayed. On the contact list screen 60, addresses of multiple types registered on a per-contact basis are displayed in the predetermined order, and addresses displayable in the display area are displayed.

In step S102, the CPU 20A determines whether an address type is selected. The CPU 20A determines whether the address-type receiving unit 52 receives an address type, for example, on the basis of an operation of the address-type selection button 62 in FIG. 4. If the determination result is affirmative, the processing proceeds to step S104. If the determination result is negative, the processing proceeds to step S112.

In step S104, the CPU 20A extracts contacts including addresses of the selected type, and the processing proceeds to step S106. Specifically, the address-type extraction unit 54 extracts contacts for which the address type received by the address-type receiving unit 52 is registered, from the contacts registered in advance in the HDD 26 as the address database (DB).

In step S106, the CPU 20A determines whether any address of the selected type is undisplayable. For example, the display-order changing unit 56 determines whether the address of the selected type is located in a place other than the first place in the predetermined display order. Alternatively, the display-order changing unit 56 determines whether the display order prevents the address of the selected type from being displayed in the display area. If the determination result is affirmative, the processing proceeds to step S108. If the determination result is negative, the processing proceeds to step S112. The term "undisplayable" denotes a state where it is not possible to display the entirety of the address of the selected type in the display area.

In step S108, the CPU 20A changes the display order of each address of the selected type to the first place, and the processing proceeds to step S110. Specifically, the display-order changing unit 56 changes the display order of the addresses of multiple types to place the address type received by the address-type receiving unit 52 in the first place.

In step S110, the CPU 20A updates the address book with the changed address book, and the processing proceeds to step S112. Specifically, the screen display 58 displays the contact list screen 60 on the display of the user interface 22 with the received address type being extracted and in the display order changed by the display-order changing unit 56.

In step S112, the CPU 20A determines whether an instruction to select an application is given. The CPU 20A determines whether, for example, one of the application selection buttons 64 provided on a per-contact basis on the contact list screen 60 is operated. If the determination result is negative, the processing proceeds to step S114. If the determination result is affirmative, the processing proceeds to step S116.

In step S114, the CPU 20A determines whether the displaying of the address book is to be terminated. The CPU 20A determines whether, for example, an operation for displaying an object other than the address book is performed on the user interface 22. If the determination result is negative, the processing returns to step S102, and steps above are repeated. If the determination result is affirmative, the series of steps are terminated.

Figure 10:
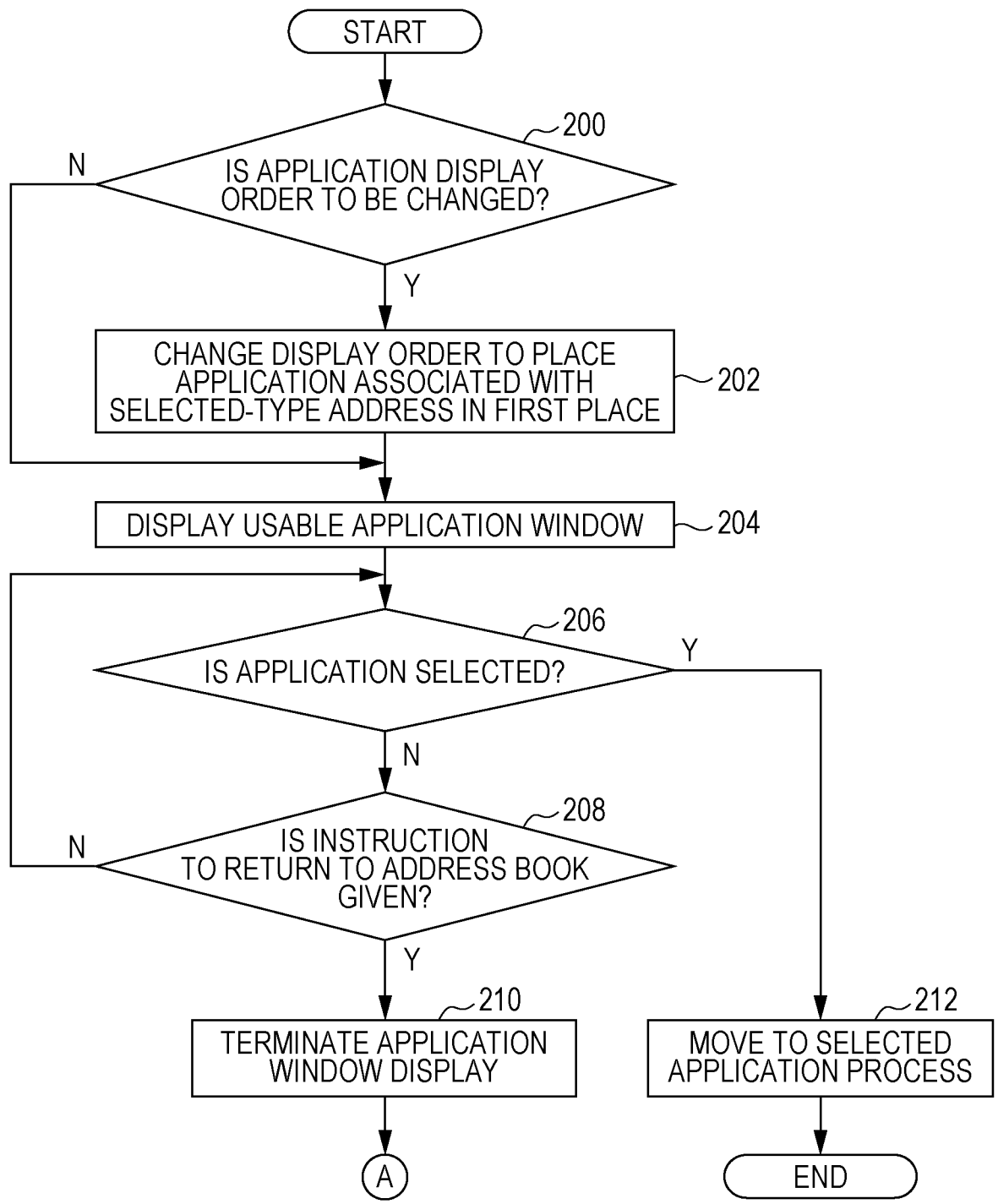
FIG. 10 is a flowchart illustrating an example of a process for displaying an application-selection-instruction window.

In contrast, in step S116, the processing proceeds to a process for displaying an application-selection-instruction window. The process for displaying an application-selection-instruction window will herein be described. FIG. 10 is a flowchart illustrating an example of the process for displaying an application-selection-instruction window.

In step S200, the CPU 20A determines whether the application display order is to be changed. The display-order changing unit 56 determines whether, for example, the application associated with the address type received by the address-type receiving unit 52 is located in a place other than the first place in the predetermined display order of the application associated with the address type registered for the contact having undergone the operation of the application selection button 64. If the determination result is affirmative, the processing proceeds to step S202. If the determination result is negative, the processing proceeds to step S204.

In step S202, the CPU 20A changes the display order to place the application associated with the address of the selected type in the first place. Specifically, the display-order changing unit 56 changes the display order of the application to place the application associated with the address type received by the address-type receiving unit 52 in the first place.

In step S204, the CPU 20A displays a usable application window, and the processing proceeds to step S206. Specifically, as illustrated in FIGS. 7 and 8, the screen display 58 displays a list of usable applications as the application window 66.

In step S206, the CPU 20A determines whether an application is selected. The CPU 20A determines whether an operation for selecting an application is performed on the displayed application window 66. If the determination result is negative, the processing proceeds to step S208. If the determination result is affirmative, the processing proceeds to step S212.

In step S208, the CPU 20A determines whether an instruction to return to the address book is given. The CPU 20A determines whether, for example, an operation of an object other than the application window 66 is performed. If the determination result is negative, the processing returns to step S206, and the steps above are repeated. If the determination result is affirmative, the processing proceeds to step S210.

In step S210, the CPU 20A terminates displaying the application window 66. The processing returns to step S102 above, and the steps above are repeated.

In contrast, in step S212, the CPU 20A moves to a process for the selected application and terminates the series of steps.

In the exemplary embodiment above, the order in which the addresses of multiple types are displayed on the contact list screen 60 is changed to display the address of the received type; however, the displaying is not limited to this. For example, only addresses of the received type may be displayed without displaying addresses of different types. Alternatively, addresses of the received type may be displayed in the first place, and addresses of different types not completely displayed in the display area, if any, may be displayed in order by performing scrolling or display change. Also for the application window 66, only the application associated with the addresses of the received type may be displayed without displaying any application associated with the addresses of different types.

Figure 11:
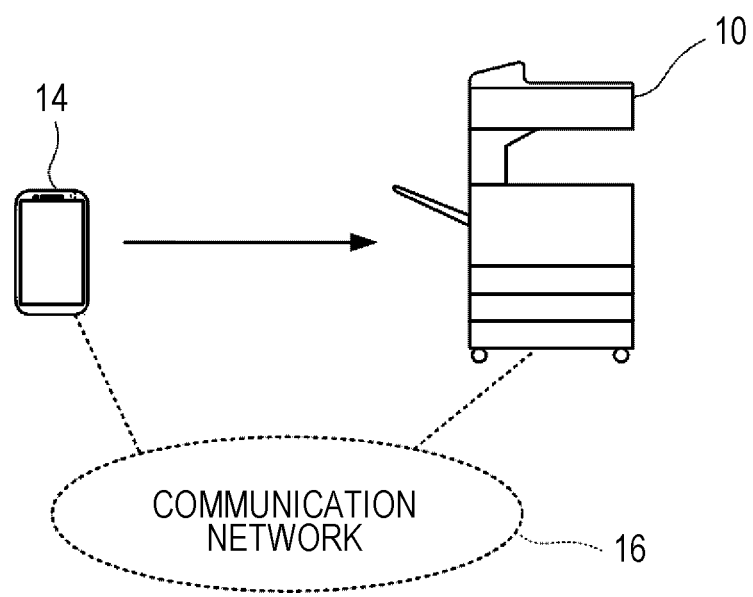
FIG. 11 is a view illustrating an example of an information processing system including the image forming apparatus and a mobile terminal apparatus.

In the exemplary embodiment above, the image forming apparatus 10 has been described as an example; however, the exemplary embodiment is not limited to this and may be applied to a mobile terminal apparatus such as a smartphone and other devices. For example, as illustrated in FIG. 11, in an information processing system including the image forming apparatus 10 and a mobile terminal apparatus 14, the mobile terminal apparatus 14 capable of remotely operating the image forming apparatus 10 may be applied to the information processing apparatus. In this case, the mobile terminal apparatus 14 is configured to be able to communicate with the image forming apparatus 10 through near field communication, and thus the image forming apparatus 10 may be operated from the mobile terminal apparatus 14. For example, a tablet terminal, a smartphone, or the like is applied to the mobile terminal apparatus 14. In addition, for example, Wi-Fi (registered trademark), Bluetooth (registered trademark), or the like is applied to the near field communication. Like the exemplary embodiment above, the contact list screen 60 may be displayed on the mobile terminal apparatus 14 when the image forming apparatus 10 is remotely operated from the mobile terminal apparatus 14 through communication between the mobile terminal apparatus 14 and the image forming apparatus 10. In this case, as represented by dotted lines in FIG. 11, the communication between the mobile terminal apparatus 14 and the image forming apparatus 10 may be performed not by the near field communication but through radio base stations in a mobile network and the like and through the communication network 16 for various networks (such as LAN, WAN, Ethernet (registered trademark)).

In the exemplary embodiment above, the example in which the address type is received after the contact list screen 60 is displayed, and then the display order of the address type is changed has been described, but the exemplary embodiment is not limited to this. For example, the address type may be received before the contact list screen 60 is displayed, and then the contact list screen 60 displayed in the display order changed from the predetermined display order may be displayed. For example, the contact list screen 60 may be displayed in such a manner that a higher priority in the display order is given to addresses of the selected type over addresses of different types by the following operations. Specifically, as illustrated in the upper part of FIG. 12, the contact list screen 60 without the list of individual contacts is displayed, an address type is selected by operating the address-type selection button 62, and thereafter an address book button 70 is operated. FIG. 12 is a view illustrating an example in which after the address type is selected, the contact list screen 60 is displayed in such a manner that a higher display priority is given to the address of the selected type over addresses of different types.

In the embodiments above, the CPU has been described as an example of the processor. The term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing by the image forming apparatus 10 according to the exemplary embodiment above may be performed by software, hardware, or combination of these. The processing by the image forming apparatus 10 may also be stored as a program in the storage medium to be distributed.

The present disclosure is not limited to the above, and it goes without saying that in addition to the above, various modifications may be made to implement the disclosure without departing from the spirit of thereof.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising: a processor configured to: display a contact screen displaying an address displayable in a display area, the address being included in an address of a type registered in advance on a per-contact basis; receive a type of an address to be displayed among addresses of a plurality of types registrable on the per-contact basis; and in response to the address of the received type not being displayed in the display area, execute a process for displaying the contact screen after changing the contact screen to display the address of the received type; and
   displaying the contact screen displaying the addresses of the plurality of types in a predetermined display order and change the contact screen to display the address of the received type by changing display priority,
   wherein the processor is further configure to: in response to reception of an instruction to select an application from the contact screen, display a selectable application and preferentially display an application associated with the address of the received type in a first place in a display area.

2. The information processing apparatus according to claim 1, wherein the processor is configured to: display the contact screen to display the address of the received type in a first place in the display area.

3. The information processing apparatus according to claim 2, wherein all of character strings of an address are displayable in the first place in the display area.

4. The information processing apparatus according to claim 1, wherein the processor is configured to: in response to character strings of the address of the received type being displayable in a second place in the display area, display the address of the received type in a first place or the second place.

5. The information processing apparatus according to claim 1, wherein the processor is configured to: in response to character strings of the address of the received type being displayable in a second place in the display area, display the address of the received type in a first place or the second place.

6. The information processing apparatus according to claim 1, wherein the processor is configured to: not display an address other than the address of the received type.

7. The information processing apparatus according to claim 1, wherein the processor is configured to: not display a contact not including the address of the received type.

8. The information processing apparatus according to claim 1, wherein the processor is configured to: in response to presence of a contact including the address of the received type not displayed in the display area, change display priority in the contact.

9. The information processing apparatus according to claim 1, wherein the processor is configured to: display the contact screen to display an address in a predetermined display order except the address of the received type.

10. The information processing apparatus according to claim 9, wherein the processor is configured to: display the address of the received type in a first place in the display area, and in response to an address of a different type not being displayed completely in the display area, to perform scrolling or changing display to display the address of the different type in order.

11. The information processing apparatus according to claim 1, wherein the processor is configured to: display an application of the received type in a first place in a display area.

12. An information processing system comprising: the information processing apparatus according to claim 1; and an image forming apparatus that receives an instruction from the information processing apparatus.

13. An information processing apparatus comprising: a processor configured to: receive a type of an address to be displayed among addresses of a plurality of types registrable on a per-contact basis; and display a contact screen displaying an address displayable in a display area, the address being included in an address of a type registered in advance on a per-contact basis, and execute a process for displaying the contact screen with a higher priority given to the address of the received type over an address of a different type in a predetermined display order in which the addresses of the plurality of types are displayed on the contact screen; and displaying the contact screen displaying the addresses of the plurality of types in a predetermined display order and change the contact screen to display the address of the received type by changing display priority, wherein the processor is further configure to: in response to reception of an instruction to select an application from the contact screen, display a selectable application and preferentially display an application associated with the address of the received type in a first place in a display area.

14. The information processing apparatus according to claim 13, wherein the processor is configured to: display the contact screen to display the address of the received type in a first place in the display area.

15. The information processing apparatus according to claim 14, wherein all of character strings of an address are displayable in the first place in the display area.

16. The information processing apparatus according to claim 13, wherein the processor is configured to: in response to character strings of the address of the received type being displayable in a second place in the display area, display the address of the received type in a first place or the second place.

17. The information processing apparatus according to claim 13, wherein the processor is configured to: not display an address other than the address of the received type.

18. A non-transitory computer readable medium storing a program causing a computer to execute a process for information processing, the process comprising: displaying a contact screen displaying an address displayable in a display area, the address being included in an address of a type registered in advance on a per-contact basis; receiving a type of an address to be displayed among addresses of a plurality of types registrable on the per-contact basis; and in response to the address of the received type not being displayed in the display area, executing a process for displaying the contact screen after changing the contact screen to display the address of the received type; and displaying the contact screen displaying the addresses of the plurality of types in a predetermined display order and change the contact screen to display the address of the received type by changing display priority, wherein the processor is further configure to: in response to reception of an instruction to select an application from the contact screen, display a selectable application and preferentially display an application associated with the address of the received type in a first place in a display area.

\* \* \* \* \*